United States Patent [19]

Sakamoto et al.

[11] Patent Number: 4,951,964
[45] Date of Patent: Aug. 28, 1990

[54] STRUCTURE FOR SUPPORTING VEHICLE SUSPENSION SYSTEM

[75] Inventors: Toshinori Sakamoto; Hideki Ono, both of Hiroshima, Japan

[73] Assignee: Semiconductor Energy Laboratory Co., Ltd., Atsugi, Japan

[21] Appl. No.: 310,432

[22] Filed: Feb. 15, 1989

[30] Foreign Application Priority Data

Feb. 17, 1988 [JP] Japan .................................. 63-32907

[51] Int. Cl.⁵ ............................................ B62D 21/02
[52] U.S. Cl. ................................... 280/788; 180/291; 180/376
[58] Field of Search ................. 280/788; 180/376, 359, 180/291

[56] References Cited

U.S. PATENT DOCUMENTS 4,813,704 3/1989 Smith .................................. 280/788

FOREIGN PATENT DOCUMENTS 60-157585 10/1985 Japan .

Primary Examiner—Charles A. Marmor
Assistant Examiner—Tamara L. Finlay
Attorney, Agent, or Firm—Sixbey, Friedman, Leedom & Ferguson

[57] ABSTRACT

In a vehicle, a power plant is disposed in an engine room formed at the front of the vehicle body with the center of gravity of the power plant positioned behind the wheel center of front wheels. A structure for supporting a suspension system for the vehicle includes a pair of front side frames which extend in the longitudinal direction of the vehicle body respectively along the left and right side walls of the engine room, and a pair of lower frame members provided on the respective front side frames so as to extend downward from the front side frames at intermediate portions thereof. Each of the lower frame members is provided with a suspension supporting portion on which the suspension system for supporting the corresponding front wheel is supported, and an opening for permitting the drive shaft for the corresponding front wheel to project outside and beyond the front side frame is formed between the lower frame member and the front side frame.

11 Claims, 5 Drawing Sheets

STRUCTURE FOR SUPPORTING VEHICLE SUSPENSION SYSTEM

BACKGROUND OF THE INVENTION

1. Field of the Invention This invention relates to a structure for supporting a suspension system for a vehicle, and more particularly to such a structure used to support a front-midship-engine type vehicle.

2. Description of the Prior Art

In a front-engine front-drive vehicle, a power plant including an engine and a differential is generally positioned sideways in an engine room with the center of gravity of the engine positioned in front of the wheel center of the front wheels. In such a front-engine front-drive vehicle, there have been problems in that an understeering tendency is excessively enhanced by the heavy load acting on the front wheels due to the weight of the power plant disposed in front of the front wheels and the moment of the weight, in that freedom in designing the front portion of the vehicle body is limited due to the power plant's being disposed at the front of the vehicle body, and in that the wheel houses disposed near the passenger room adversely affect the arrangement of the accelerator pedal, the brake pedal and the clutch pedal in the passenger room. In order to overcome these problems, there has been proposed a front-midship engine type vehicle in which the power plant is positioned so that the center of gravity of the engine is behind the wheel center of the front wheels as disclosed in Japanese Utility Model Publication No. 63(1988)-23219, for example.

SUMMARY OF THE INVENTION

The primary object of the present invention is to provide a structure for supporting a suspension system which is particularly useful for front-midship-engine type vehicles.

In accordance with the present invention, there is provided a structure for supporting a suspension system for a vehicle having a power plant which is disposed in an engine room formed at the front of the vehicle body with the center of gravity of the power plant positioned behind the wheel center of the front wheels, which structure comprises a pair of front side frames which extend in the longitudinal direction of the vehicle body respectively along the left and right side walls of the engine room, and a pair of lower frame members provided on the respective front side frames so as to extend downward from the front side frames at intermediate portions thereof, each of the lower frame members being provided with a suspension supporting portion on which the suspension system for supporting the corresponding front wheel is supported, and having an opening formed between the lower frame member and the front side frame for permitting the drive shaft for the corresponding front wheel to project outside and beyond the front side frame.

In accordance with a preferred embodiment of the present invention, the lower frame member comprises front and rear vertical portions, which extend downward in a substantially vertical direction from portions of the front side frame and which are spaced from each other in the longitudinal direction of the vehicle body, and a horizontal portion which connects the lower ends of the front and rear vertical portions. The lower frame member thus defines an opening between the front side frame and itself. The suspension system is generally mounted on the horizontal portion, and the drive shaft is passed through the opening.

The loop-like structure defined by the lower frame member and the front side frame suppresses the vertical deformation of the front side frame and causes the front side frame to deform in the horizontal direction upon collision, thereby absorbing the impact and controlling the direction of movement of the engine upon collision.

DESCRIPTION OF THE PREFERRED EMBODIMENTS

Figure 1:
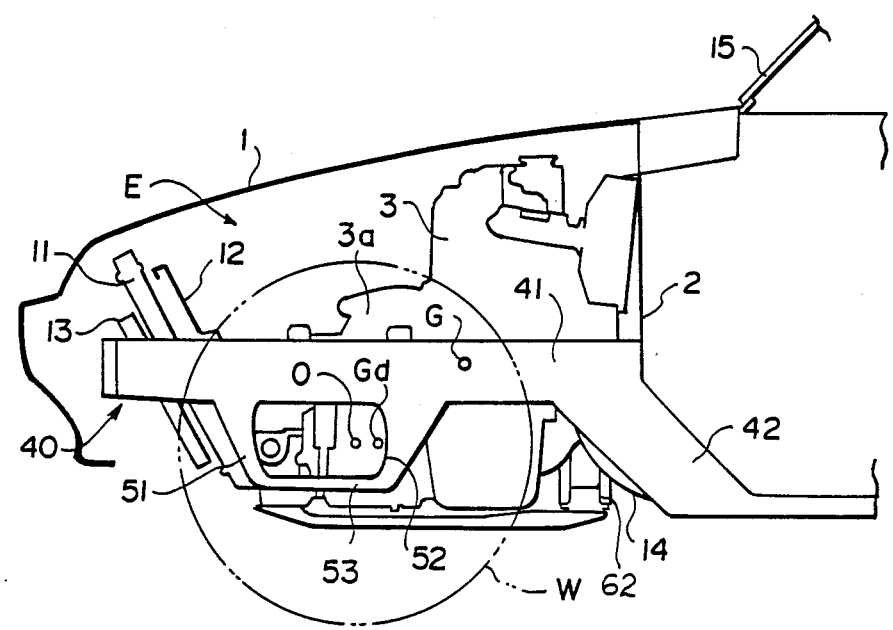
FIG. 1 is a schematic side view showing a vehicle provided with a structure for supporting a suspension system in accordance with an embodiment of the present invention.

In FIG. 1, a front-engine front-drive vehicle has an engine room E defined below a hood 1 and in front of a dashboard panel 2. An engine 3 is disposed sideways in the engine room E and a differential 3a is disposed in front of the engine 3. A pair of front side frames 40 extend in the longitudinal direction of the vehicle body respectively along left and right side walls of the engine room E. (Only the left front side frame 40 is visible in FIG. 1.)

Figure 2:
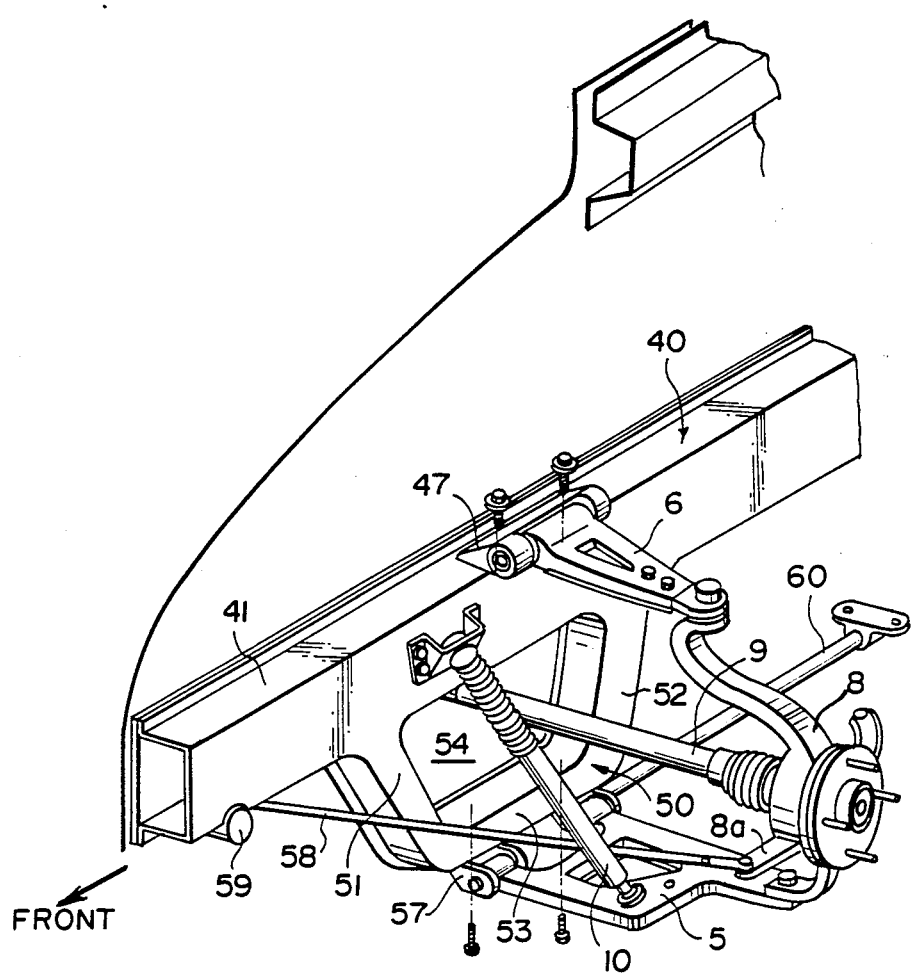
FIG. 2 is an enlarged perspective view of a part of FIG. 1.
Figure 4A:
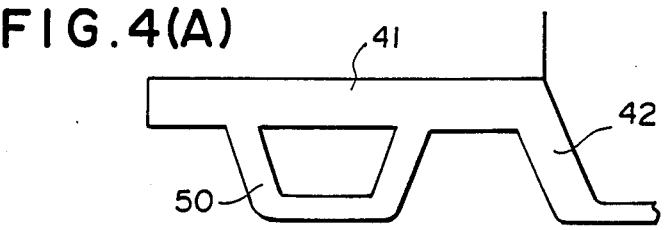
FIGS. 4(A) to 4(D) are Views for illustrating the behavior of the front side frame and the lower frame upon collision.
Figure 4B:
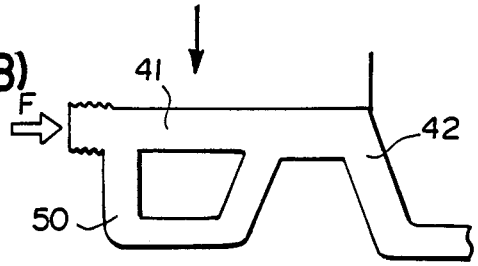
Figure 4C:
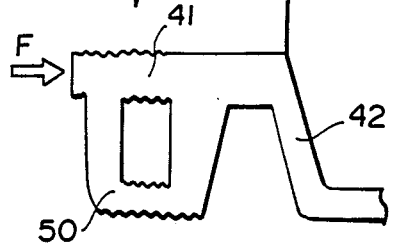
Figure 4D:
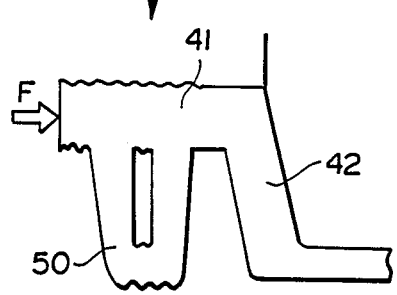

As is clearly shown in FIG. 2, the front side frame 40 comprises a straight portion 41 extending in the longitudinal direction of the vehicle body and a base portion 42 which is wider than the straight portion 41 and extends rearwardly and downwardly from the rear end of the straight portion 41. The front side frame 40 is provided with a lower frame 50 which is formed integrally with the front side frame 40 and extends downward therefrom at an intermediate portion of the straight portion 41. The lower frame 50 comprises front and rear vertical portions 51 and 52 which extend downwardly in a substantially vertical direction and are spaced from each other in the longitudinal direction of the vehicle body, and a horizontal portion 53 which connects the lower ends of the front and rear vertical portions 51 and 52. The lower frame 50 thus defines an opening 54 between the front side frame 40 and itself. The front side frame 40 and the lower frame 50 are integrally formed of a flat inner panel and an outer panel having a channel-like cross-section which are welded together to form a closed cross-section. The front side frame 40 is connected to the dashboard panel 2 at the rear end and to a cross member (not shown) extending in the transverse direction of the vehicle body at the front end. The loop-like structure defined by the lower frame 50 and the front side frame 40 suppresses the vertical deformation of the front side frame and causes the front side frame 40 to deform in the horizontal direction upon collision thereby absorbing the impact and controlling the direction of movement of the engine upon collision. That is, FIG. 4(A) shows the normal state of the loop-like structure formed by the front side frame 40 and the lower frame 50. When the structure is subjected to an impact F, at first only the front end portion of the straight portion 41 is first compressed as shown in FIG. 4(B). Then the middle portion of the straight portion 41 and the lower frame 50 are both compressed as shown in FIG. 4(C), and finally the whole front side frame 40 is compressed as shown in FIG. 4(D). Because the loop-like structure deforms in this manner, the buckling of the straight portion of the front side frame 40 is prevented, and the impact upon collision is absorbed.

One end of a suspension arm lower 5 of a double wishbone type suspension pivots on the lower side of the horizontal portion 53 of the lower frame 50 by way of a supporting portion 57 and one end of a suspension arm upper 6 of the suspension pivots on the upper side of the straight portion 41 of the front side frame 40 just above the suspension arm lower 5 by way of a supporting portion 47. The suspension arm lower 5 and the suspension arm upper 6 extend outwardly and the other ends of the suspension arm lower 5 and the suspension arm upper 6 are connected to a knuckle 8, thereby pivotally supporting the knuckle 8 which supports a drive shaft 9 which rotates. The drive shaft 9 projects outwardly through the opening 54 defined by the loop-like structure and is connected to a corresponding front wheel W (which is the left front wheel in the case of the drive shaft 9 shown in FIG. 2). One end of a damper spring 10 is fixed to the upper side of the suspension arm lower 5 and the other end of the damper spring 10 is fixed to the outer side surface of the front side frame 40 by way of a bracket. One end of a tie rod 58 is connected to a rack-and-pinion type steering gear system. (Only one end of a rod 59 provided with the rack is shown in FIG. 2. The rod 59 is mounted on the left and right front side frames 40 at opposite ends.) The other end of the tie rod 58 is connected for rotation to a knuckle arm 8a fixed to the knuckle 8 to turn the front wheel W on the drive shaft 9 in response to the operation of the steering wheel (not shown). Further a torsion bar 60 is fixed to the suspension arm lower 5 at one end and to a floor panel (not shown) of the vehicle body at the other end.

Figure 3:
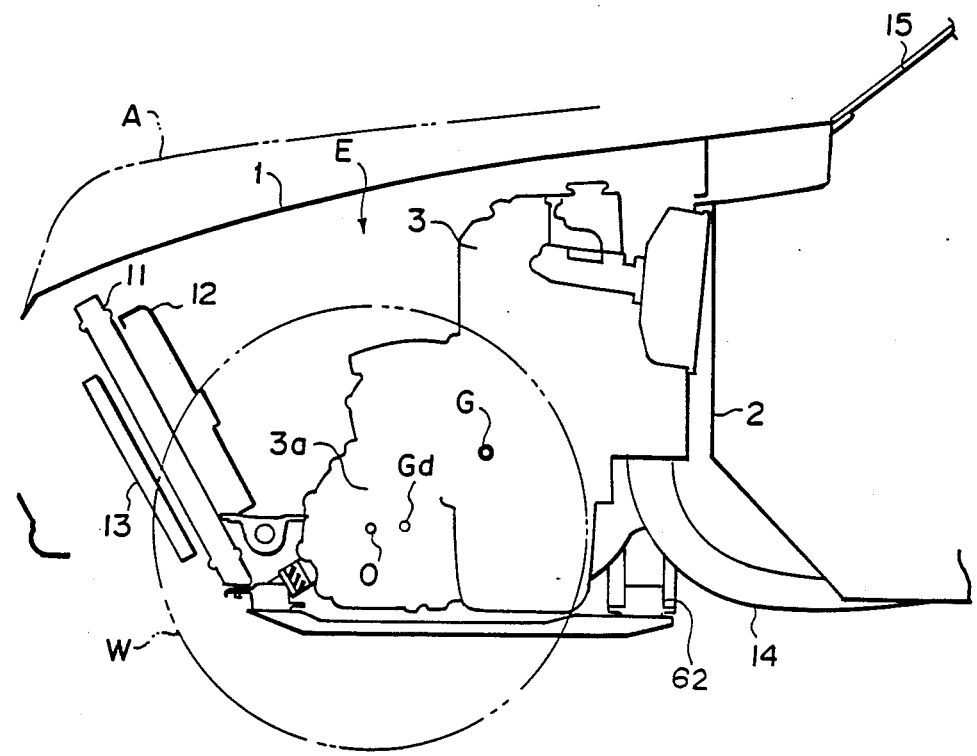
FIG. 3 is a view similar to FIG. 1 but with the front side frame removed.

In FIGS. 1 and 3, reference numerals 11 to 15 respectively denote a radiator, cooling fan, a condenser for an airconditioner, an exhaust pipe and a windshield. Further, reference numeral 62 denotes a sub frame rear which connects the left and right front side frames at a portion near the dashboard 2. Though not shown, a sub frame front connects the left and right front side frames at a portion near the front ends thereof and a sub frame center extends in the longitudinal direction of the vehicle body and connects the middles of the sub frame rear 62 and the sub frame front.

With the arrangement described above, the distance between the dashboard 2 and the wheel center 0 of the front wheels W can be lengthened as shown in FIG. 3, and accordingly, the engine 3 and the differential 3a can be disposed so that the center of gravity G of the engine and the center of gravity $G_d$ of the differential 3a are behind the wheel center 0 of the front wheels W. Further, since the suspension arm lower 5 and the suspension arm upper 6 are mounted on the front side frame 40 and the lower frame 50 which are integral with each other, the mounting accuracy is improved and the manufacturing cost can be reduced.

Figure 5:
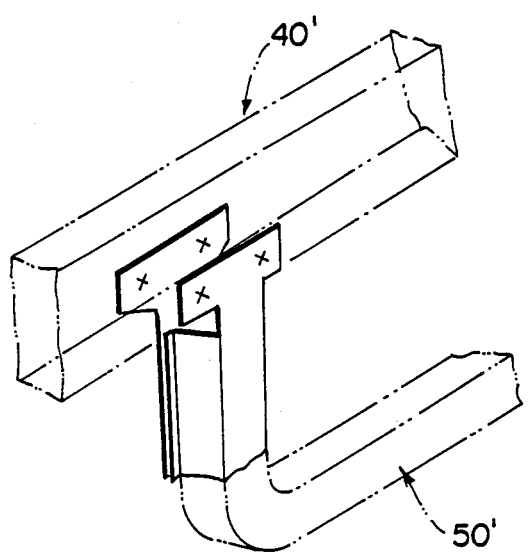
FIG. 5 is a schematic view for illustrating another embodiment of the present invention.

Though the lower frame 50 is formed integrally with the front side frame 40 in the embodiment described above, a lower frame 50' may be formed separately from a front side frame 40' and fixed to the front side frame 40' as shown in FIG. 5.

As can be understood from the description above, the engine can be positioned so that its center of gravity is behind the wheel center of the front wheels, that is, the center of gravity of the heavy engine can be disposed inside the wheelbase, by the use of the structure for supporting the suspension in accordance with the present invention, and accordingly, the driving stability of the vehicle can be improved. Further, since the engine can be disposed near the rear end of the engine room, a large space can exist behind the radiator, whereby better ventilation can be obtained and wherein auxiliary mechanisms can be accommodated. Further, since the cylinder head portion which is the highest in the engine is disposed rearward, the front end portion of the hood 1 may be lower than the front end portions of the hoods in conventional front-engine front drive vehicles in which the engine is mounted sideways. The shape of the engine hood in typical conventional front-engine front-drive vehicles is shown by a chained line in FIG. 3. Accordingly by inclining the radiator, the vehicle body may have a shape like a wedge which offers little resistance to air.

We claim:

1. A structure for supporting a suspension system for a vehicle having a power plant which is disposed in an engine room formed at the front of the vehicle body with the center of gravity of the power plant positioned behind the wheel center of the front wheels, the structure comprising a pair of front side frames which extend in the longitudinal direction of the vehicle body respectively along the left and right side walls of the engine room, and a pair of lower frame members provided on the respective front side frames so as to extend downward from the front side frames at intermediate portions thereof, each of the lower frame members being provided with a suspension supporting portion on which the suspension system for supporting the corresponding front wheel is supported, and having an opening formed between the lower frame member and the front side frame for permitting a drive shaft for the corresponding front wheel to project outside and beyond the front side frame.

2. A structure as defined in claim 1 in which each of said front side frames has a straight portion extending in the longitudinal direction of the vehicle body and an inclined portion extending rearwardly and downwardly from the rear end of the straight portion and each of said lower frame members comprises front and rear vertical portions, which extend in a substantially vertical direction downwardly from portions of the straight portion and which are spaced from each other in the longitudinal direction of the vehicle body, and a horizontal portion which connects the lower ends of the front and rear vertical portions, whereby said opening is formed between the front side frame and the lower frame member.

3. A structure as defined in claim 2 in which said lower frame member is formed integrally with the front side frame.

4. A structure as defined in claim 3 in which said front side frame and the lower frame member are formed of a substantially flat inner panel and an outer panel which is channel-shaped in cross-section.

5. A structure as defined in claim 2 in which said power plant includes an engine and a differential, and the center of gravity of the differential is in front of center of gravity of the engine.

6. A structure as defined in claim 2 in which said power plant includes an engine, a differential and a transmission and the differential is connected to the drive shafts and is positioned in front of the engine.

7. A structure as defined in claim 2 in which said suspension system comprises upper and lower arms extending in the transverse direction of the vehicle body, the lower arm being pivoted on the horizontal portion of the lower frame member and the upper arm being pivoted on the straight portion of the front side frame at a position just above the lower arm.

8. A structure as defined in claim 7 in which the upper end of a damper unit is mounted on the straight portion of the front side frame and the other end of the damper unit is mounted on the lower arm of the suspension system.

9. A structure as defined in claim 7 in which a steering gear system for turning the front wheels in response to the operation of the steering wheel is positioned in front of the drive shaft.

10. A structure as defined in claim 9 in which said steering gear system includes a rod provided with a rack which meshes with a pinion connected to a steering wheel and is moved in the transverse direction of the vehicle body in response to the operation of the steering wheel, and a pair of tie rods which extend rearward and are respectively connected for rotation to left and right knuckles by way of knuckle arms fixed to the knuckles.

11. A structure as defined in claim 10 in which said rod provided with the rack is mounted on the left and right front side frames at opposite ends.

* * * * *

UNITED STATES PATENT AND TRADEMARK OFFICE
CERTIFICATE OF CORRECTION

PATENT NO. : 4,951,964

DATED : August 28, 1990

INVENTOR(S) : Toshinori Sakamoto et al.

It is certified that error appears in the above-identified patent and that said Letters Patent is hereby corrected as shown below:

On the title page, "[73] Assignee: Semiconductor Energy Laboratory" should read as follows:

--[73] Assignee: Mazda Motor Corporation, Hiroshima, Japan--

Signed and Sealed this

Seventh Day of April, 1992

Attest:

HARRY F. MANBECK, JR.

*Attesting Officer*   *Commissioner of Patents and Trademarks*